US009910876B2

(12) United States Patent
Alvey et al.

(10) Patent No.: US 9,910,876 B2
(45) Date of Patent: *Mar. 6, 2018

(54) QUERY HANDLING IN A COLUMNAR DATABASE

(71) Applicant: International Business Machines Corporation, Armonk, NY (US)

(72) Inventors: Walter D. Alvey, San Jose, CA (US); Ronald J. Barber, San Jose, CA (US); Yi Ding, Beijing (CN); Chandrasekaran Mohan, Saratoga, CA (US); Steven R. Pearson, Portland, OR (US); Richard S. Sidle, Mountain View, CA (US); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 14/301,399

(22) Filed: Jun. 11, 2014

(65) Prior Publication Data

US 2015/0363440 A1 Dec. 17, 2015

(51) Int. Cl.
*G06F 17/30* (2006.01)

(52) U.S. Cl.
CPC .. *G06F 17/30315* (2013.01); *G06F 17/30339* (2013.01); *G06F 17/30477* (2013.01)

(58) Field of Classification Search
None
See application file for complete search history.

(56) References Cited

U.S. PATENT DOCUMENTS

| 5,794,229 A | * | 8/1998 | French | G06F 17/30324 |
| 5,963,933 A | * | 10/1999 | Cheng | G06F 17/30454 |
| 6,223,176 B1 | * | 4/2001 | Ricard | G06F 17/30348 |

(Continued)

OTHER PUBLICATIONS

"New IBM Big Data Technology for Dramatically Faster Data Analysis and Decision-Making Enters the Market, Made-in-IBM-Labs "BLU Acceleration" Technology Now Generally Available", IBM News room, Jun. 26, 2013, Armonk, NY, <http://www-03.ibm.com/press/us/en/pressrelease/41397.wss>, "Grace Period Disclosure".

(Continued)

*Primary Examiner* — Aleksandr Kerzhner
*Assistant Examiner* — Eddy Cheung
(74) *Attorney, Agent, or Firm* — Alexander G. Jochym; Maeve Carpenter

(57) ABSTRACT

According to one embodiment of the present invention, a method for processing a query in a column database is provided. The method for analyzing test results may include a computer, associating a first set of metadata values with a set of records in a table, wherein each record has an associated state indicated by a metadata value. The method may further include the computer receiving a query to return one or more records of the set of records. The method may further include the computer determining that one or more records in the set of records satisfies the query. The method may further include the computer determining whether at least a first record in the one or more records that satisfies the query is in a returnable state based, at least in part, on the metadata value.

11 Claims, 6 Drawing Sheets

(56) References Cited

U.S. PATENT DOCUMENTS

| | | | |
|---|---|---|---|
| 8,423,528 B2 | 4/2013 | Renkes et al. | |
| 2002/0138483 A1* | 9/2002 | Bretl | G06F 17/30351 |
| 2007/0073737 A1 | 3/2007 | Patterson | |
| 2009/0019029 A1* | 1/2009 | Tommaney | G06F 17/30471 |
| 2009/0240663 A1* | 9/2009 | Plattner | G06F 17/30592 |
| 2010/0281005 A1* | 11/2010 | Carlin | G06F 17/30312 |
| | | | 707/696 |
| 2011/0055257 A1* | 3/2011 | Renkes | G06F 17/30336 |
| | | | 707/769 |
| 2015/0106382 A1* | 4/2015 | Liu | G06F 17/30315 |
| | | | 707/744 |

OTHER PUBLICATIONS

"Query Handling in a Columnar Database", U.S. Appl. No. 14/644,264, filed Mar. 11, 2015.
IBM Appendix P, list of IBM patents or patent applications treated as related, Mar. 11, 2015.

* cited by examiner

| TSN | TS | PrevRowTSN | FIRST | LAST |
|---|---|---|---|---|
| 100 | 11 | | JOHN | SMITH |
| 101 | 10 | | TIMOTHY | PETERS |
| 102 | 11 | | MATTHEW | WADE |
| 103 | 01 | | PHILIP | DOE |
| 104 | 11 | | JAMES | PAGE |
| 105 | 11 | | JOSHUA | GORDON |
| 106 | 00 | | ALAN | JONES |
| 107 | 11 | 106 | ALAN | JOHNSON |
| 108 | | | | |
| 109 | | | | |
| 110 | | | | |
| 111 | | | | |

FIG. 4

QUERY HANDLING IN A COLUMNAR DATABASE

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) New IBM Big Data Technology for Dramatically Faster Data Analysis and Decision-Making Enters the Market, Jun. 26, 2013.

BACKGROUND OF THE INVENTION

The present invention relates generally to the field of columnar database management, and more particularly to handling queries during decomposed updates.

A columnar (column) database is a particular type of database in which a database management system (DBMS) arranges the information of a two-dimensional table so that all of the values of a given column are stored together. The database management system stores the values for each column in order, then stores the values of the next column in order, etc. Since improved compression rates are one of the main motivations for storing column values together, columnar databases typically store the values in a given column in a highly compressed manner (i.e., with little or no free space between column values). Rather than store record identifiers (RIDs) with each column value, column databases typically store column values for a given row in the same ordinal location for each column. For example, the fifth value in column 1 is part of the same row as the fifth value in column 2, etc.

Because of the highly compressed data and the need to maintain consistency in ordinal location for each row, typical column databases employ a decomposed update method to update row values. In a decomposed update, the DBMS deletes the current value for a row in each column, and then inserts a new, updated version (for column values which have changed) of each value in the same ordinal location of each column. During a decomposed update, individual rows can be locked while they are being modified. For example, a write lock can be put in place on a particular row in order to prevent users from reading a particular record while it is being updated by another user. Typical database management systems can perform lock tests to determine at a given point in time whether a particular record is locked for editing by another user.

Database administrators and other persons or machines (users) accessing the information in the database manipulate the data using particular commands, called queries, to the database. Common queries include "SELECT" to return a row, "INSERT" to insert a record, "UPDATE", to change a record, and "DELETE", to remove a record. When a user submits a query to return records with specific attributes, the DBMS returns records based on the nature of the query and the status of the record requested by the user. Another factor which affects the rows that can be viewed at a particular time is the isolation level of the request. In general, an isolation level determines what information in the database is visible to other users carrying out concurrent operations on the database. The lowest isolation level (i.e., provides the least consistent view of the data) is "uncommitted read" (UR), which allows users performing concurrent operations on the database to perform "dirty reads" (i.e., users can view changes that have not yet been committed to the database by other users). Another common isolation level in column databases is the "cursor stability" (CS) level. In a CS isolation level, a given row is visible if it is committed when it is examined by the query. This does not preclude the row from being invalidated at some later point in the life of the query. As a result, CS queries will provide a more consistent view of the data than UR queries, but the view is not fully consistent.

SUMMARY

According to one embodiment of the present invention, a method for processing a query in a column database is provided. The method for analyzing test results may include a computer, associating a first set of metadata values with a set of records in a table, wherein each record has an associated state indicated by a metadata value. The method may further include the computer receiving a query to return one or more records of the set of records. The method may further include the computer determining that one or more records in the set of records satisfies the query. The method may further include the computer determining whether at least a first record in the one or more records that satisfies the query is in a returnable state based, at least in part, on the metadata value.

According to another embodiment, a computer program product for processing a query in a column database is provided. The computer program product may include one or more computer-readable storage media and program instructions stored on the one or more computer-readable storage media. The computer-readable storage media may have stored thereon program instructions to associate a first set of metadata values with a set of records in a table, wherein each record has an associated state indicated by a metadata value. The computer-readable storage media may further include program instructions to receive a query to return one or more records of the set of records. The computer-readable storage media may further include program instructions to determine that one or more records in the set of records satisfies the query. The computer-readable storage media may further include program instructions to determine whether at least a first record in the one or more records that satisfies the query is in a returnable state based, at least in part, on the metadata value.

According to another embodiment, a computer system for processing a query in a column database is provided. The computer system may include one or more computer processors. The computer system may further include one or more computer-readable storage media and program instructions stored on the one or more computer-readable storage media. The computer-readable storage media may have stored thereon program instructions to associate a first set of metadata values with a set of records in a table, wherein each record has an associated state indicated by a metadata value. The computer-readable storage media may further include program instructions to receive a query to return one or more records of the set of records. The computer-readable storage media may further include program instructions to determine that one or more records in the set of records satisfies the query. The computer-readable storage media may further include program instructions to determine whether at least a first record in the one or more records that satisfies the query is in a returnable state based, at least in part, on the metadata value.

BRIEF DESCRIPTION OF THE DRAWINGS

FIG. 4 is an example column database table, in accordance with an embodiment of the present invention.

DETAILED DESCRIPTION

Figure 1:
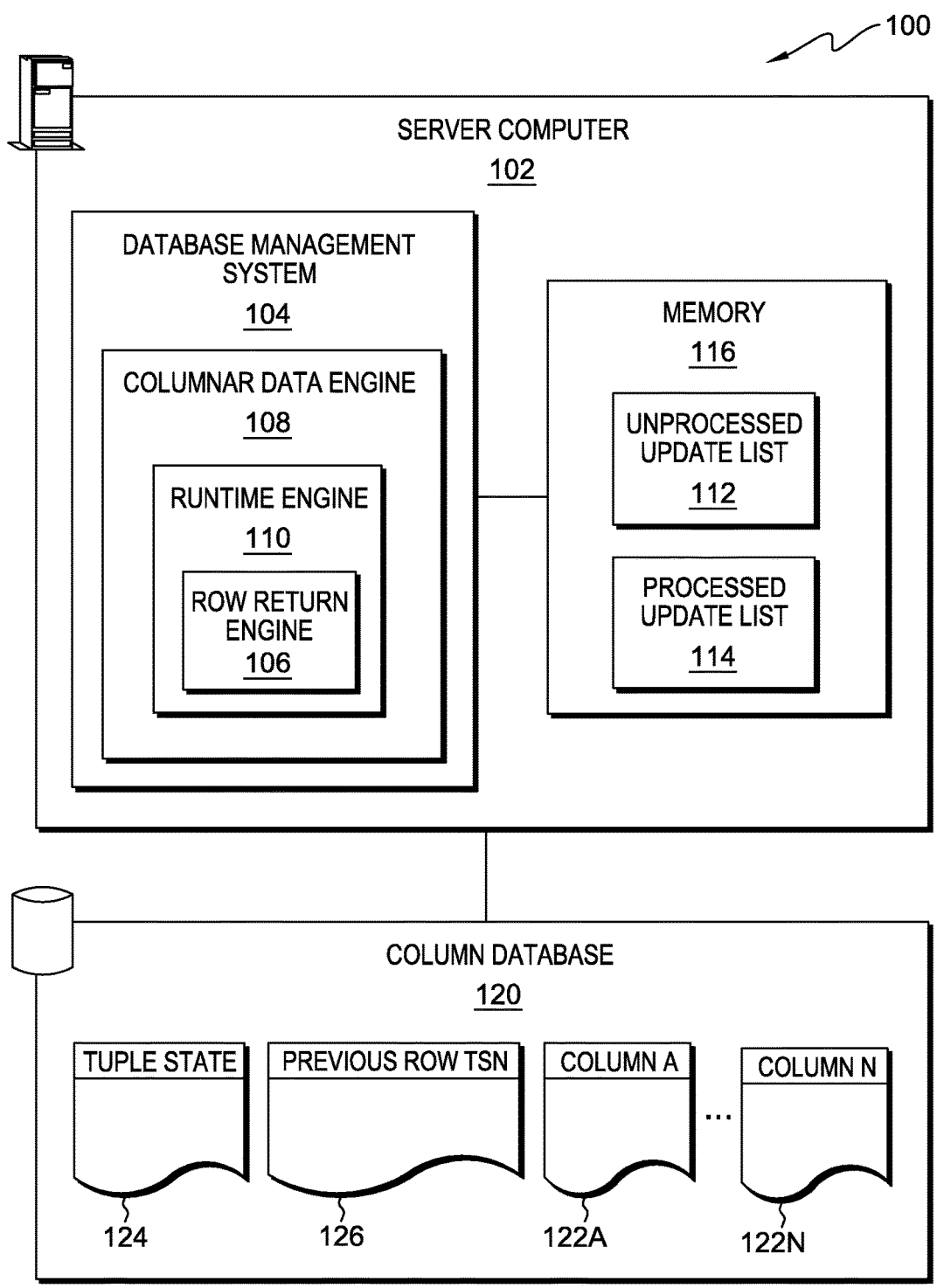
FIG. 1 is a functional block diagram illustrating a relational database management environment ("environment"), in accordance with an embodiment of the present invention.

Embodiments of the present invention recognize that many column databases update information in the database using a decomposed update process of deleting an old record, or row, and inserting a new record with updated information. The process of a decomposed update results in the possibility of multiple copies of a single row in the database. Therefore, a need exists to define a mechanism to ensure that only one version of each record is returned and that the returned record is the most current record in the database that can be returned consistent with the particular isolation level that applies to the query. As discussed below, to be "returnable," a given record must satisfy two criteria. First, in order to be returnable, the record must match the query criteria (e.g., have the specified value, be located in the specified column, etc.). Second, the row must be in a "returnable state." Determining whether a record is in a returnable state can depend, for example, on the update/deletion history of the record, the status of the record within a decomposed update, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a relational database management environment ("environment"), generally designated 100, in accordance with an embodiment of the present invention.

Environment 100 includes server computer 102 and column database 120. In various embodiments, server computer 102 can be a server, a laptop computer, a tablet computer, a netbook computer, a personal computer (PC), or a desktop computer. In other embodiments, server computer 102 represents a computing system utilizing clustered computers and components to act as a single pool of seamless resources. In general, server computer 102 can be any computing device, or a combination of devices, with access to database management system (DBMS) 104, memory 116, and column database 120 and capable of running row return engine 106. Server computer 102 may include internal and external hardware components, as depicted and described in further detail with respect to FIG. 5. In the illustrative embodiment depicted in FIG. 1, server computer 102 includes DBMS 104 and memory 116. DBMS 104 includes columnar data engine 108, which further includes runtime engine 110. Memory 116 includes unprocessed update list 112 and processed update list 114.

DBMS 104 is a software application designed to receive inputs from a user, which may be a human, another application, or the database itself, in order to capture and analyze data. DBMS 104 can process requests from users in one or more database languages, such as a data definition language, data manipulation language, or a query language. Some languages, such as the structured query language (SQL), combine aspects of different database languages to improve versatility. In general, DBMS 104 is an application that allows the definition, creation, querying, update, and administration of one or more databases, such as column database 120.

Columnar data engine 108 is a software component of DBMS 104 that manages queries and transactions of information with respect to column database 120. In various embodiments, DBMS 104 can include multiple data engines, each of which is configured to handle transactions in a particular type of database. For example, DBMS 104 can also include a row data engine which can handle queries and transactions relating to data stored in a row-oriented database. Columnar data engine 108 includes runtime engine 110. Runtime engine 110 is a software module that analyzes received statements in a query language, such as SQL, SPL, MDX, LDAP, DMX, etc., and reads/writes/modifies information stored in column database 120. Runtime engine 110 includes row return engine 106.

Row return engine 106 is software with functionality to analyze the status of various row values in column database 120 in order to determine whether a particular value is appropriate to be returned to a user based on a query submitted to DBMS 104. Row return engine 106 includes functionality to read and write to one or more lists, such as unprocessed update list 112 and processed update list 114. Row return engine 106 also includes functionality to read and write to one or more metadata columns, such as tuple state column 124 and previous row TSN column 126, which are stored in association with data stored in column database 120.

Memory 116 includes a magnetic hard disk drive. Alternatively, or in addition to a magnetic hard disk drive, memory 116 can include a solid state hard drive, a semiconductor storage device, read-only memory (ROM), erasable programmable read-only memory (EPROM), flash memory, or any other computer-readable storage media that is capable of storing program instructions or digital information. Memory 116 may also be removable. For example, a removable hard drive may be used for memory 116. Other examples include optical and magnetic disks, thumb drives, and smart cards that are inserted into a drive for transfer onto another computer-readable storage medium that is also part of memory 116. Memory 116 can also be random access memory (RAM) and/or cache memory. In general, memory 116 can include any suitable volatile or non-volatile computer-readable storage media.

Unprocessed update list 112 is a list data structure that maintains a record of particular rows that are in the process of being updated by DBMS 104, and the updated version of the row has been committed to column database 120, but the previous version of the row has not yet been deleted from column database 120. Processed update list 114 is a list data structure that maintains a record of particular rows that are the product of a decomposed update (i.e., the row an updated version of a row that was already in column database 120) and are "returnable" as determined by row return engine 106.

Column database 120 is an organized collection of data organized according to a column structure that stores values in the database according to the values' column, as opposed to the values' row. In the illustrative embodiment depicted in FIG. 1, the information stored on column database 120 is stored on a magnetic hard disk drive. In various other embodiments, the information included in column database 120 can be stored on solid state hard drive, a semiconductor storage device, read-only memory (ROM), erasable programmable read-only memory (EPROM), flash memory, or any other computer-readable storage media that is capable of storing digital information, or any combination thereof. Column database 120 includes tuple state column 124, previous row tuple state number (TSN) column 126, and columns 122A to 122N.

Columns 122A to 122N represent a two dimensional table of information stored in column database 120 in a columnar fashion so that the values of a given column are stored in memory next to each other. In the illustrative embodiment, each value in columns 122A to 122N has an ordinal location within the column. The ordinal location is a property of each value in each column. In various embodiments of the present invention, the ordinal location of each value can be referred to as the "tuple sequence number" of the row. In typical columnar databases, row values in each column are stored in the same ordinal location in all columns. For example, a value stored in the first memory location of column 122A is part of the same row as the value stored in the first memory location of column 122N, and both of these values can be said to have a tuple sequence number of "1".

Columns 122A to 122N are the values of a table stored in column database 120. In the illustrative embodiment, column 122A represents the first column of values in the table. In column database 120, the values in the table that make up individual records are stored according to the column in which they are located, as opposed to a row oriented database in which each value in a particular record is stored in order prior to writing the next record into the database. Columns 122A to 122N include one or more record values for various records in column database 120. In an embodiment, these record values may be stored in a compressed fashion in order to conserve memory space. At the end of each column in column database 120, is unfilled memory space for additions and modifications to the column. Because column database 120 uses decomposed updates to modify the contents of columns 122A to 122N, old versions of an updated row persist in the database, but are designated as DELETED (or possibly PENDING UPDATE or PENDING DELETE, as discussed below) while completely new versions of the modified row are inserted into the end of the same, or a different insert range. The practice of inserting a whole new row at the end of the values stored in a given insert range ensures that sufficient space exists to store all of the updated column value in one location and, as a result, all of the values that belong to a single record maintain a constant tuple sequence number and can, therefore, be easily located and returned in response to various queries received from a user. At a given point in time, each insert range has an associated "high water mark". A high water mark is a particular location in each column (denoted by the tuple sequence number of that row) which stores the last inserted and committed row. All memory space in the column after the high water mark is either empty, or stores uncommitted inserts. The empty space in an insert range can subsequently be filled by newly inserted rows, or modifications of the values in column database 120 through the decomposed update process.

Tuple state column 124 is a metadata column stored in association with the table values stored in columns 122A to 122N. In the illustrative embodiment, tuple state column 124 is an internal, uncompressed two-bit column that exists for every table (i.e., there is a single two-bit tuple state column for all tables) and indicates the current state of each row in the table. In the illustrative embodiment, the four possible two-bit values ("tuple state values") indicate that a row is "INSERTED", "PENDING UPDATE", "PENDING DELETE", or "DELETED". A row that has an INSERTED tuple state value and is below the high water mark for a given table is the currently committed and most up to date version of the row. When a transaction modifies a row, the tuple state number of the row is first updated to a PENDING UPDATE state. The PENDING UPDATE state indicates that the row is either in the process of being updated, or has recently been updated. Once the updated version of the row has been inserted into the insert range for the table and no queries are currently dependent on the PENDING UPDATE row, the tuple state value changes to PENDING DELETE. The PENDING DELETE state is similar to the PENDING UPDATE state in that it indicates that the row is currently undergoing, or about to undergo, an update. PENDING DELETE indicates that the row is about to be deleted from column database 120. The final tuple state value is DELETED, which indicates that the row is no longer part of column database 120 either because the row has been updated and there is a more current version of the row, or because the row was deleted and is no longer in the column database 120. Rows that have a DELETED tuple state value are never returned to users as the result of a query because there is either a newer version of that record (in the case of an update), or they are no longer considered part of the database (in the case that the record is no longer needed in the database).

Previous row TSN 126 is a metadata column stored in association with the table values stored in columns 122A to 122N. In the illustrative embodiment, previous row TSN 126 is a column that maintains information on updated rows and indicates, if applicable, the tuple sequence number of a previous version of the row. For example, in a database with records ranging from one to one hundred, the value with a tuple sequence number of 70 can have a value set in previous row TSN 126 that identifies a record that the value with tuple sequence number 70 replaced (e.g., a record with tuple sequence number 55). Previous row TSN 126 allows row return engine 106 to identify the most current version of a row when a previous version of the row had a tuple state value of PENDING UPDATE or PENDING DELETE when it was first encountered while scanning the table values to locate those records that should be returned in response to a query.

Figure 2:
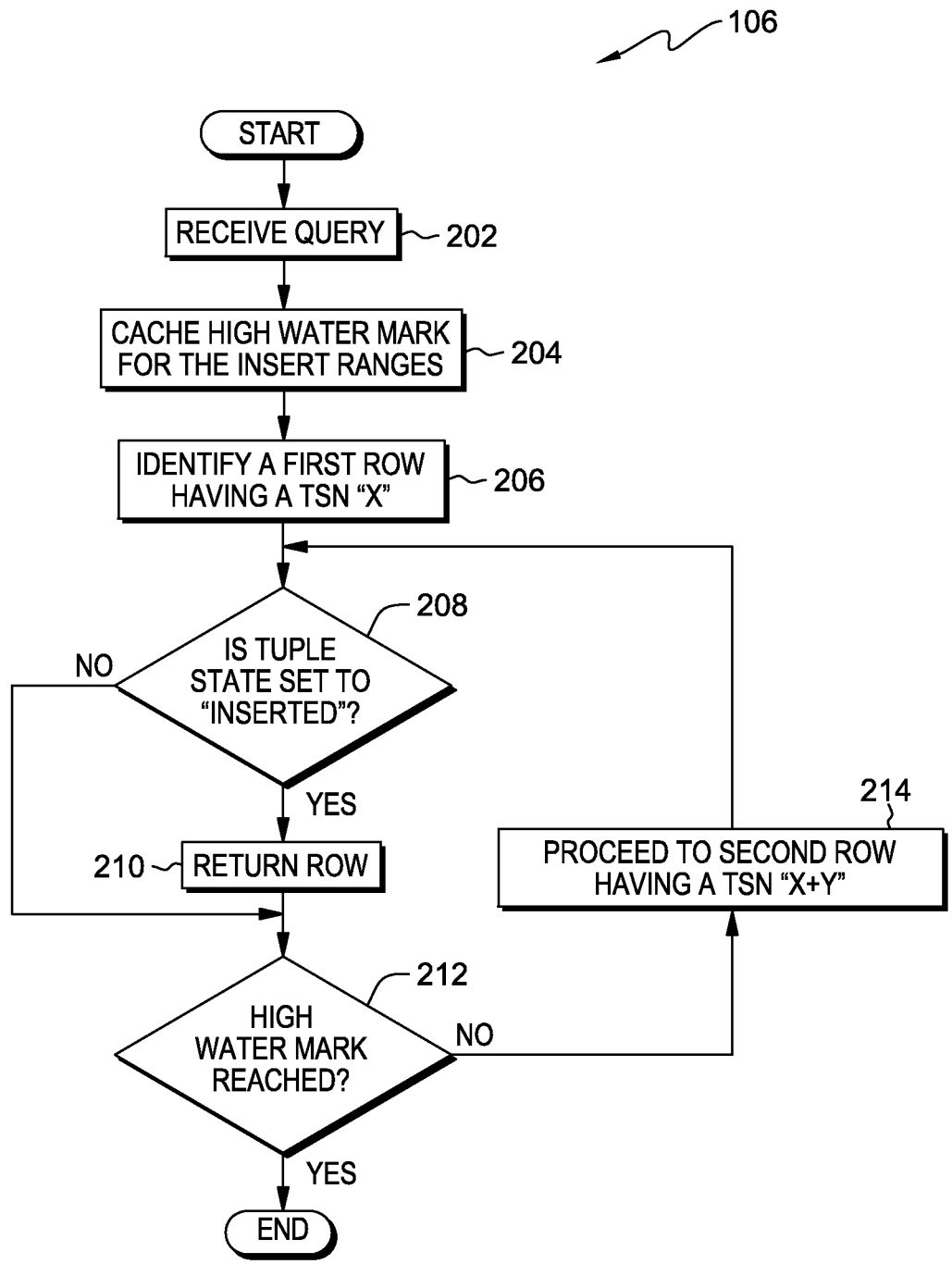
FIG. 2 is a flowchart depicting operational steps of a row return engine, on a server computer within the environment of FIG. 1, in accordance with an embodiment of the present invention.

FIG. 2 is a flowchart depicting operational steps of row return engine 106, in accordance with an illustrative embodiment of the present invention. In the illustrative embodiment, row return engine 106 applies to queries having an isolation level set to uncommitted read or a similar isolation level. In the uncommitted read case, columnar data engine 108 can perform a "dirty read", which means that runtime engine 110 can determine what other transactions are taking place within column database 120 at the time that the query is being processed.

Row return engine 106 receives a query (step 202). In the illustrative embodiment, row return engine 106 receives a query from a user through a user interface associated with DBMS 104. In alternative embodiments, the query can be received from a separate application with access to DBMS 104. The query details a request for information from column database 120. In some embodiments, queries can also include manipulations and modifications of the data stored in column database 120, such as updating specific entries or deleting records. A query can be written in any language that DBMS 104 is capable of understanding and processing using columnar data engine 108, such as contextual query language, DMX, FQL, HTSQL, LINQ, OQL, OttoQL, SQL, XQuery, etc.

Row return engine 106 caches the high water mark for the insert ranges (step 204). In the illustrative embodiment, row return engine 106 determines the tuple sequence number of the last row of each insert range for the table in the column database 120 that has values stored in column 122A to 122N and stores the tuple sequence numbers in memory associated with server computer 102. Memory components of server computer 102 are discussed in further detail with respect to FIG. 5.

Row return engine 106 identifies a first row having a tuple state number "X" that matches the query (step 206). In the illustrative embodiment, row return engine 106 begins scanning the information stored in column database 120 from the lowest tuple sequence number in a given insert range and proceeds sequentially through the information stored therein to identify records in columns 122A to 122N that should be returned in response to the received query (i.e., the rows match the query criteria). For example, in a database that maintains two columns, one having a list of first names, and the second having a list of last names, an example query may request a list of those records where the first name value is "John." Row return engine 106 begins scanning from the lowest tuple sequence number in the first name column and sequentially inspects each record to determine if the value "John" appears in the record. The tuple sequence number is the ordinal location of each record in the column.

Row return engine 106 determines whether the tuple state value for the record having tuple state number "X" is set to indicate that the record is INSERTED (decision block 208). In the illustrative embodiment, row return engine 106 reads the two-bit number stored in tuple state column 124 to determine whether the two-bit corresponds to a status of INSERTED. If row return engine 106 determines that the tuple state value is set to inserted (decision block 208, YES branch), then row return engine 106 returns the values in the row having tuple state number "X" according to the rules specified in the received query (step 210). If row return engine 106 determines that the tuple state value is not set to indicate that the row is INSERTED (decision block 208, NO branch), then row return engine 106 determines whether row return engine 106 has reached the high water mark as determined in step 204 (step 212). As one skilled in the art will appreciate, returning a row according to rules specified in the received queries is a function that can be performed by runtime engine 110.

In various embodiments, determining that the tuple state value is not set to INSERTED means that the tuples state value is set to one of the other three two-bit values, which indicates that the row is set to PENDING UPDATE, PENDING DELETE, or DELETED. Where the isolation level is set to uncommitted read, row return engine 106 can view rows that are in the process of being updated as it scans and perform "dirty reads" to view currently uncommitted updates. Therefore, when PENDING UPDATE is indicated with respect to the row with tuple sequence number "X", row return engine 106 continues scanning in pursuit of a more current version of the row having a tuple state value set to INSERTED, which can be determined by scanning previous row TSN column 126.

Row return engine 106 determines whether the high water mark has been reached (decision block 212). Row return engine 106 compares the tuple sequence number of the current row to the tuple sequence number that was stored in cache memory as the high water mark in step 204. If row return engine 106 determines that the current row tuple sequence number matches the cached high water mark value (decision block 212, YES branch), then row return engine 106 terminates for the current query. If row return engine 106 determines that the current row tuple sequence number does not match the cached high water mark (decision block 212, NO branch), then row return engine 106 continues scanning the values in column database 120 to identify a second row having a second tuple sequence number, "X+Y" that matches the query criteria (step 214) and determines whether the tuple state for the second row is set to INSERTED (decision block 208).

Figure 3A:
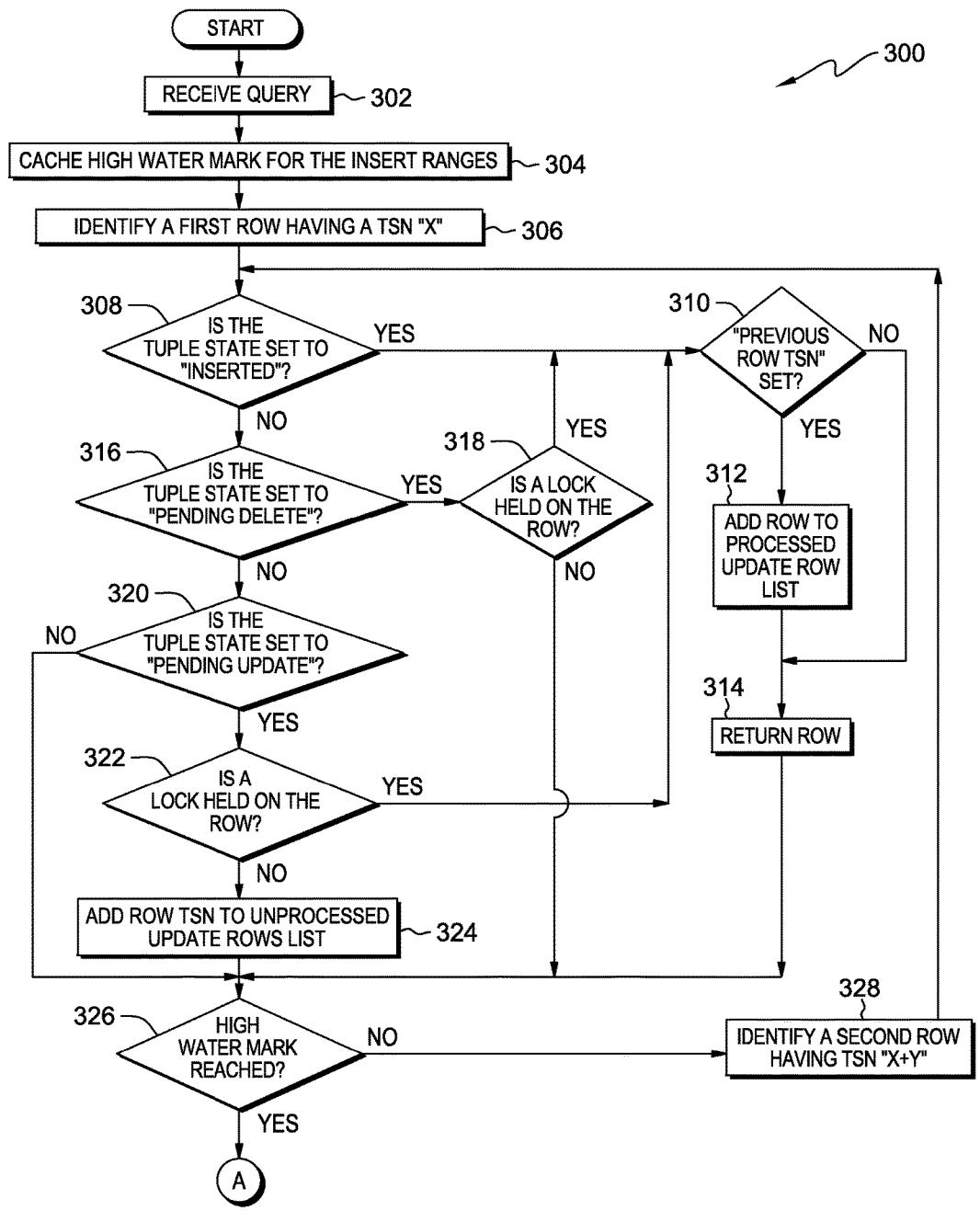
FIGS. 3A and 3B are a flowchart depicting operational steps of a row return engine, on a server computer within the environment of FIG. 1, in accordance with an embodiment of the present invention.
Figure 3B:
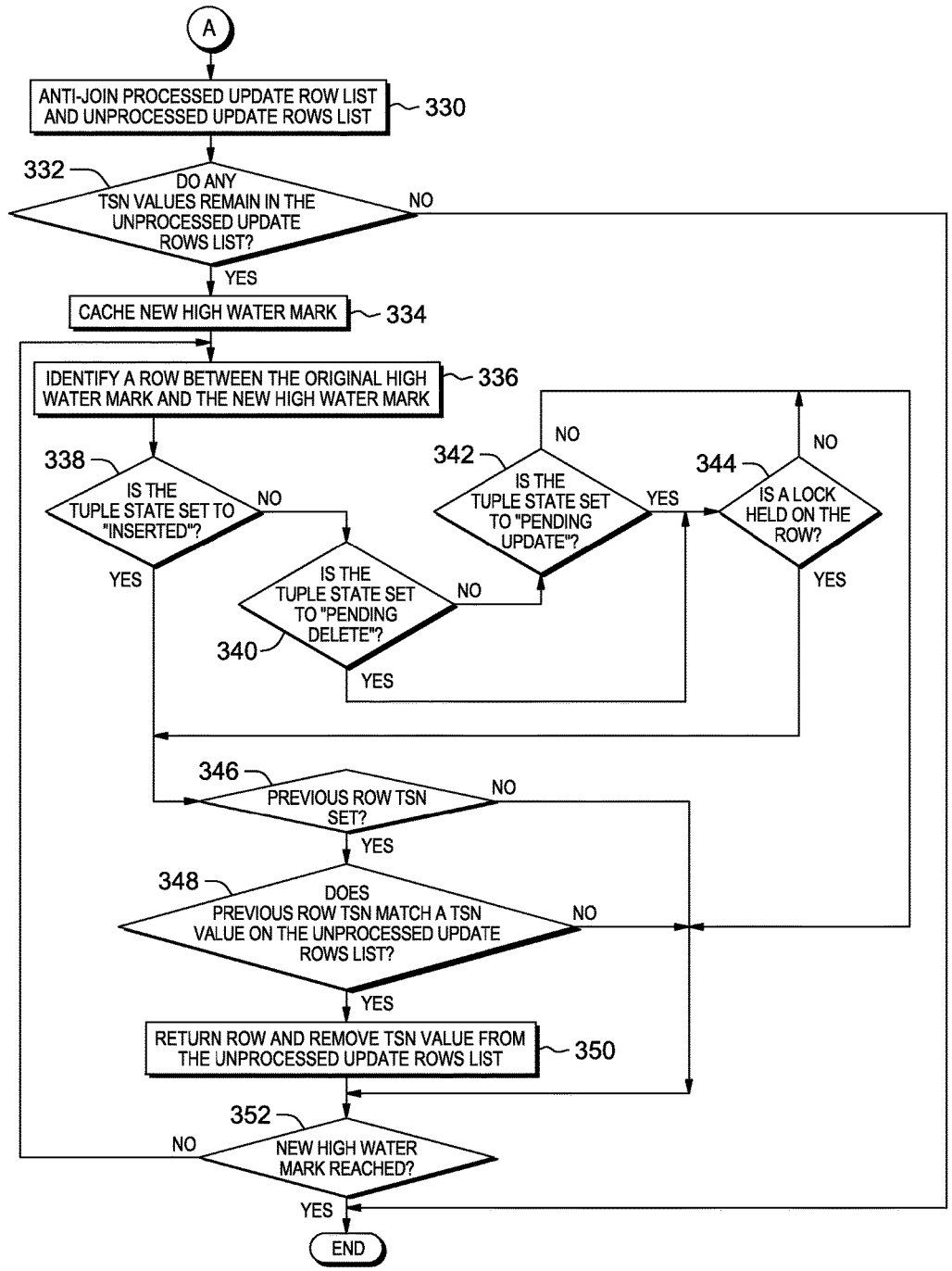

FIGS. 3A and 3B are a flowchart depicting operational steps of a row return engine running with a cursor stability with currently committed isolation level, generally designated 300, in accordance with an example embodiment of the present invention.

Row return engine 300 receives a query from a user (step 302). In the example embodiment, a user submits a query to return certain rows stored in one or more insert ranges in column database 120 through a user interface associated with DBMS 104. In alternative embodiments, the query can be received from a separate application with access to DBMS 104. A query is a request for information from column database 120. In some embodiments, queries can also include manipulations and modifications of the data stored in column database 120, such as updating specific entries or deleting records. A query can be written in any language that DBMS 104 is capable of understanding and processing using columnar data engine 108, such as contextual query language, DMX, FQL, HTSQL, LINQ, OQL, OttoQL, SQL, XQuery, etc. In the example embodiment, the query specifies the isolation level as cursor stability with currently committed. This isolation level ensures that the most recently committed version of each row is returned in the query, even if the most recently committed version is currently being modified. In alternative embodiments, columnar data engine 108 determines that the isolation level is cursor stability with currently committed.

Row return engine 300 caches the high water marks for the insert ranges being searched (step 304). In the example embodiment, row return engine 300 determines the tuple sequence number of the last row in each of the insert ranges for the table stored in column database 120 that has values stored in column 122A to 122N and stores the tuple sequence number in memory associated with server computer 102. Memory components of server computer 102 are discussed in further detail with respect to FIG. 5.

Row return engine 300 identifies a first row having a tuple state number "X" that matches the query criteria (step 306). In the example embodiment, row return engine 300 begins scanning the information stored in column database 120 from the lowest tuple sequence number in a given insert range and proceeds sequentially through the information stored therein to identify records in columns 122A to 122N that should be returned in response to the received query. For example, in a database that maintains two columns, one having a list of first names, and the second having a list of last names, an example query may request a list of those records where the first name value is "John". Row return engine 300 begins scanning from the lowest tuples sequence number in the first name column and sequentially inspects each record to determine if the first name is "John." The tuple sequence number is the ordinal location of each record in the column.

Row return engine 300 determines whether the tuple state of row X is set to INSERTED (decision block 308). In the example embodiment, row return engine 300 inspects the two-bit number stored in tuple state column 124 at the same ordinal location as row X and determines whether the two-bit number represents that the state of the row is INSERTED. For example, the two-bit value stored in tuple state column 124 with tuple sequence number X can be set to "11", where "11" indicates that the row is INSERTED. If row return engine 300 determines that the tuple state associated with row X is set to INSERTED (decision block 308, YES branch), then row return engine 300 determines whether row X has a value set in previous row TSN column 126 (decision block 310). Row return engine 300 reads whether a value is present in previous row TSN column 126 at the location associated with row X. If row return engine 300 determines that there is no value set for row X in previous row TSN column 126 (decision block 310, NO branch), then row return engine 300 returns the row to the device submitted the query (step 314). If row return engine 300 determines that a value is set in previous row TSN column 126 (decision block 310, YES branch), then row return engine 300 adds row X to processed update list 114 (step 312) and returns the row to the device that submitted the query (step 314). Row return engine 300 determines whether the high water mark has been reached (decision block 326) (discussed below)

If row return engine 300 determines that the tuple state is not set to INSERTED (decision block 308, NO branch), then row return engine 300 proceeds to determine if the tuple state of row X is set to indicate PENDING DELETE (decision block 316). In the example embodiment, row return engine 300 reads the two-bit value stored in tuple state column 124 at the location associated with row X. If row return engine 300 determines that the tuple state of row X is set to indicate that that row is PENDING DELETE (decision block 316, YES branch), then row return engine 300 performs a lock test to determine whether row X is locked for an update (decision block 318). As will be appreciated by one skilled in the art, the lock test is a well-known mechanism within database management system 104 that determines whether a particular record is currently locked for editing by another user. A lock is a mechanism that blocks other transactions from modifying the locked record in a way that would cause problems for the transaction requesting the lock. If row return engine 300 determines that a lock is held on row X (decision block 318, YES branch), then row return engine 300 determines whether row X has a value set in previous row TSN column 126 (decision block 310). The presence of a lock on row X indicates that the row is currently being updated, but as of the point in time that row X is checked by row return engine 300, row X is the currently committed version of that record. If row return engine 300 determines that there is not a lock in place on row X (decision block 318, NO branch), then row return engine 300 determines whether the high water mark has been reached (decision block 326) (discussed below).

If row return engine 300 determines that the tuple state for row X in tuple state column 124 is not set to indicate that the row is PENDING DELETE (decision block 316, NO branch), then row return engine 300 determines whether the tuple state for row X is set to indicate that row X is PENDING UPDATE (decision block 320). In the example embodiment, row return engine 300 inspects the two-bit number stored in tuple state column 124 at the same ordinal location as row X and determines whether the two-bit number represents that the state of the row is PENDING UPDATE. If row return engine 300 determines that the tuple state for row X is not set to PENDING UPDATE (decision block 320, NO branch), then row return engine 300 determines whether the high water mark for the current insert range is reached (decision block 326) (discussed below). In the example embodiment, a determination that the tuple state is not set to PENDING UPDATE is equivalent to a determination that the tuple state is set to DELETED (based on process of elimination). As noted above, rows which have a tuple state set to DELETED are never returned in response to a query.

If row return engine 300 determines that the tuple state associated with row X is set to PENDING UPDATE (decision block 320, YES branch), then row return engine 300 determines whether there is a lock held on row X (decision block 322). As discussed above, lock tests are common in the art and provide information on whether a particular row is currently locked for editing by another user. If row return engine 300 determines that a lock is currently held on row X (decision block 322, YES branch), then row return engine 300 determines whether row X has a value set in previous row TSN column 126 (decision block 310). The lock held on row X indicates that the update being processed that modifies row X has not yet committed, and row X is the currently committed version of the record described by row X. In the cursor stability with currently committed isolation level, row return engine 300 is designed to return the currently committed version of a row that satisfies the requirements of the received query. If row return engine 300 determines that a lock is not held on row X (decision block 322, NO branch), then row return engine 300 adds the row tuple state number ("X") to unprocessed rows list 112 (step 324). In the example embodiment, unprocessed rows list 112 maintains a list of those rows which, at the time row return engine 300 determines whether the row should be returned, have been updated and the updated version of the row has been committed.

Row return engine 300 determines whether the high water mark has been reached (decision block 326). Row return engine 300 compares the tuple state number of the current row to the tuple state number that was stored in cache memory as the high water mark in step 304. If row return engine 300 determines that the current row tuple state number does not match the cached high water mark (decision block 326, NO branch), then row return engine 300 continues scanning the values in column database 120 to identify a second row having a tuple state number, "N+M", that matches the query criteria (step 328) and determines whether the tuple state for the second row is set to INSERTED (decision block 308). If row return engine 300 determines that the current row tuple state number matches the cached high water mark value (decision block 326, YES branch), then row return engine 300 performs an anti-join operation on processed update list 114 and unprocessed update list 112 (step 330). In an alternative embodiment in which a table spans multiple insert ranges, prior to performing the anti-join procedure, the steps described in FIG. 3A may be repeated for each of the insert ranges that the table spans.

Row return engine 300 performs an anti-join operation on processed update list 114 and unprocessed update list 112 (step 330). In the example embodiment, row return engine 300 performs the anti-join by comparing entries in processed rows list 114 with entries in unprocessed rows list 112 and removing those values which appear in both lists. After the anti-join, processed update list 114 will be empty, but unprocessed update list 112 may or may not still contain entries.

Row return engine 300 determines whether any tuple state numbers remain in unprocessed update list 112 (decision block 332). In the example embodiment, row return engine 300 can determine if values remain by checking the number of values in the list and determining whether that number is zero. If row return engine 300 determines that no entries remain in unprocessed update list 112 (decision block 332, NO branch), then row return engine 300 terminates execution for the received query. If row return engine 300 determines that one or more entries remain in unprocessed update list 112 (decision block 332, YES branch), then row return engine 300 caches a new high water mark (step 334) for each of the insert ranges in the table. In the example embodiment, row return engine 300 conducts a second scan in the insert range beyond the original high water mark in order to ensure that the currently committed version of rows which were not returned during the original scan but were added to unprocessed rows list 112 are returned. In the event that the updated version of the rows included on unprocessed rows list 112 were committed while the original scan was in progress, the scan beyond the original high water mark returns the latest committed version of the rows. Row return engine 300 determines what the highest tuple sequence number in the given insert range is that has a record associated with it. Row return engine 300 scans a column in the insert range, such as column 122A, to determine the last row that has an entry. Row return engine 300 then stores the tuple sequence number in a memory device, such as a cache, that is associated with server computer 102.

Row return engine 300 identifies a row between the original high water mark and the new high water mark that satisfies the conditions of the query (step 336). In the example embodiment, row return engine 300 scans the contents of column database 120 according to the conditions of the received query until it locates a row that is consistent with the conditions of the query.

Row return engine 300 determines whether the tuple state of the identified row is set to indicate that the row is INSERTED (decision block 338). In the example embodiment, row return engine 300 reads the two-bit number stored in tuple state column 124 that is associated with the identified row. Row return engine 300 determines whether the two-bit number indicates that the row is INSERTED based on a predefined key (e.g., a tuple state number of "11" indicates that the row is INSERTED). If row return engine 300 determines that the tuple state of the identified row is not set to INSERTED (decision block 338, NO branch), then row return engine 300 determines whether the tuple state of the identified row is set to indicate that the row is PENDING DELETE (decision block 340). The determination of whether the tuple state of the identified row is set to PENDING DELETE can be accomplished in the same fashion as determining whether the tuple state of the identified row is set to INSERTED.

If row return engine 300 determines that the tuple state associated with the identified row is set to indicate that the identified row is PENDING DELETE (decision block 340, YES branch), then row return engine 300 performs a lock test to determine whether a lock is held on the identified row (decision block 344). As discussed above, a lock test is a well-known mechanism used in database management systems to determine whether a particular record is currently being updated by another user. If row return engine 300 determines that the tuple state associated with the identified row is not set to indicate that the identified row is PENDING DELETE (decision block 340, NO branch), then row return engine 300 determines whether the two-bit number associated with the identified row indicates that the identified row is PENDING UPDATE (decision block 342). If row return engine 300 determines that the tuple state associated with the identified row is not set to indicate that the row is PENDING UPDATE (decision block 342, NO branch), then row return engine 300 determines whether the new high water mark has been reached (decision block 352) (discussed below).

If row return engine 300 determines that the two-bit number in tuple state column 124 is set to indicate that the identified row is PENDING UPDATE (decision block 342, YES branch), then row return engine 300 performs a lock test on the identified row to determine if a lock is currently held on the identified row (decision block 344). A lock test is a well-known mechanism used in database management systems to determine whether a particular record is currently being updated by another user. If row return engine 300 determines that a lock is not currently held on the identified row (decision block 344, NO branch), then row return engine 300 determines whether the new high water mark has been reached (decision block 352) (discussed below). If row return engine 300 determines that a lock is currently held on the identified row (decision block 344, YES branch), then row return engine 300 determines whether the identified row has a tuple sequence number identified in previous row TSN column 126 (decision block 346). Row return engine 300 inspects previous row TSN column 126 to determine if a value has been entered to indicate that the identified row is an updated version row of another row. If row return engine 300 determines that there is no value in previous row TSN column 126 (decision block 346, NO branch), then row return engine 300 determines whether the new high water mark has been reached (decision block 352) (discussed below).

If row return engine 300 determines that a value is present in previous row TSN column 126 that corresponds to the identified row (decision block 346, YES branch), then row return engine 300 determines whether the value in previous row TSN column 126 is also located in unprocessed update list 112 (decision block 348). Row return engine 300 compares the value found in previous row TSN column 126 to the values stored in unprocessed update list 112 to determine if the value appears in both. If row return engine 300 determines that the value from previous row TSN column 126 does not match a value in unprocessed update list 112 (decision block 348, NO branch), then row return engine 300 determines whether the new high water mark was reached (decision block 352) (discussed below). If row return engine 300 determines that the value from previous row TSN column 126 also exists in unprocessed update list 112 (decision block 348, YES branch), then row return engine 300 returns the identified row to the user in response to the query and removes the value associated with the identified row in previous row TSN column 126 from unprocessed update list 112 (step 350).

Row return engine 300 determines whether the new high water mark has been reached (decision block 352). In the example embodiment, row return engine 300 compares the tuple state number of the identified row with the new high water mark. If row return engine 300 determines that the tuple state number of the identified row matches the new high water mark (decision block 352, YES branch), then row return engine 300 terminates for the received query. If row return engine 300 determines that the tuple state number of the identified row does not match the new high water mark, then row return engine 300 identifies a new row between the original high water mark and the new high water mark that satisfies the query (step 336).

FIG. 4 is an example column database table, generally designated 400, in accordance with an embodiment of the present invention. Column database table 400 includes tuple sequence numbers 402, tuple state column 404, previous row TSN column 406, first name column 408, and last name column 410.

Each tuple sequence number in tuple sequence numbers 402 is a property of the row with which it is associated. In the example embodiment, tuple sequence numbers 402 are not stored in memory in association with column database table 400. Rather, tuple sequence numbers 402 can be determined by scanning the rows included in column database table 400 and counting each row as the sequential scan progresses. In alternative embodiments, tuple sequence numbers 402 can be stored in a metadata column associated with column database table 400.

Tuple state column 404 includes information detailing the status of the rows described by tuple state numbers 402. In the example embodiment, there are four possible values in tuple state column 404 where each of the possible values is represented by a two-bit number. "11" indicates that the row is INSERTED. "10" indicates that the row is PENDING UPDATE. "01" indicates that the row is PENDING DELETE. "00" indicates that the row is DELETED.

Previous row TSN column 406 includes, if applicable, the tuple state number of a previous version of the row. In the example embodiment, row 107 has a previous row TSN value of 106. The previous row TSN value for row 107 indicates that row 107 is an updated version of row 106. This fact is supported by the tuple state column values for these two rows. The tuple state column value for row 106 indicates that the row is DELETED, and the tuple state column value for row 107 indicates that the row is INSERTED. Therefore, one can conclude that a decomposed update was performed on row 106 which resulted in the creation of row 107 and deleted row 106 from column database table 400.

First name column 408 and last name column 410 represent the data stored in column database table 400. The contents of first name column 408 and last name column 410 are the values that a user can submit a query to search and return certain values. For example, a user can submit a query to return those rows having a first name that starts with the letter 'J.' This query results in the return of rows 100 ("John"), 104 ("James"), and 105 ("Joshua").

High water mark 412 is the last row having an entry at the time row return engine 106 receives a query that has values in first name column 408 and last name column 410. In the case of a query with an uncommitted read isolation level, row return engine 106 will scan the entries of column database table 400 in sequential order of tuple state numbers 402 until high water mark 412 is reached. In the event of a query with a cursor stability with currently committed semantics isolation level, then row return engine 300 scans the contents of column database table 400 until it reaches high water mark 412 and then checks to determine whether there are any entries remaining on unprocessed update list 112 to determine if a new high water mark should be cached (not shown) and the scan should continue.

Rows 414 are empty rows included in column database table 400 that facilitate the use of decomposed updates by allowing the creation of new versions of rows at the end of the highly compressed column database contents. As rows in column database table are updated, new versions of the rows with the applied updates can be created in rows 414 in a sequential manner (i.e., the first new row is created in row 108, the second in row 109, etc.).

Figure 5:
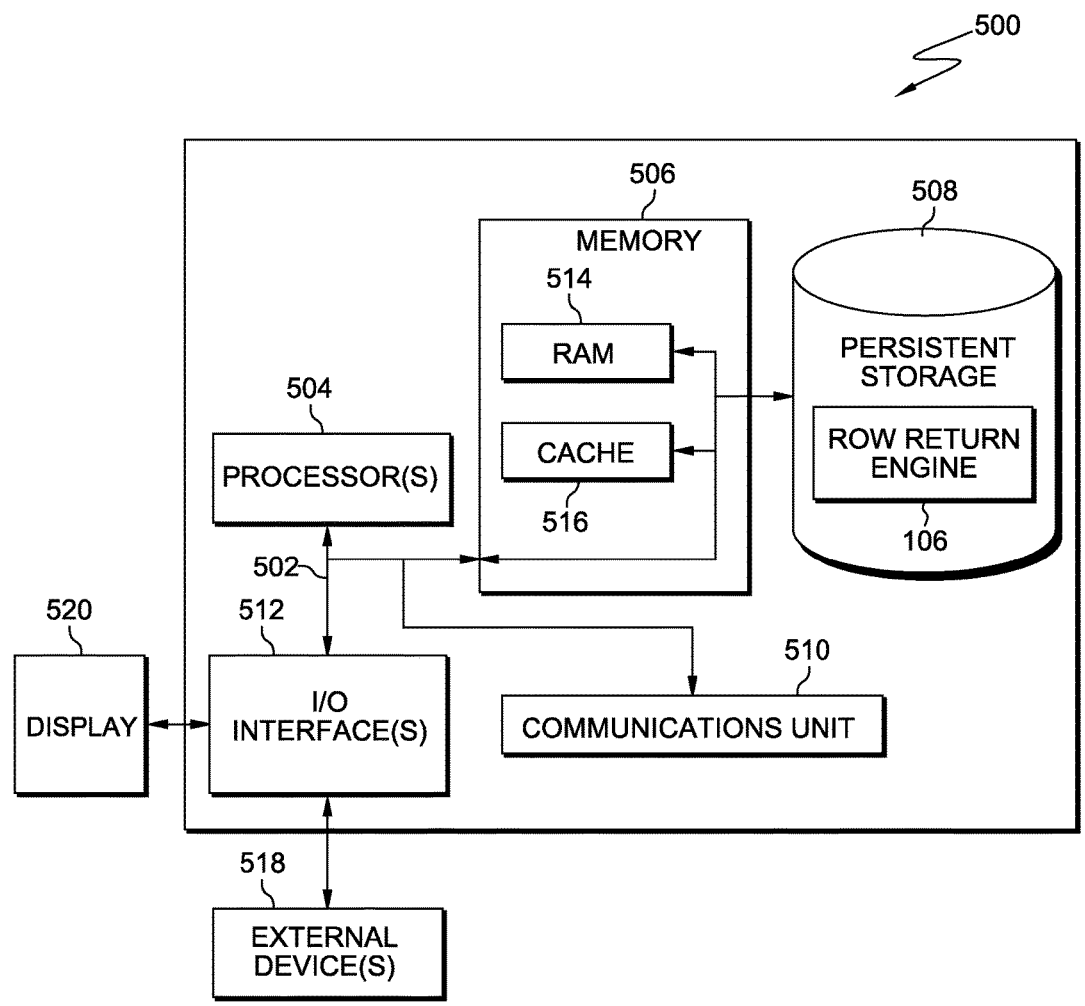
FIG. 5 depicts a block diagram of components of the proxy server computer executing the intelligent mapping program, in accordance with an embodiment of the present invention.

FIG. 5 depicts a block diagram, generally designated 500, of components of server computer 102 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Row return engine 106 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of column database 120. In these examples, communications unit 510 includes one or more network interface cards. Communications unit 510 may provide communications through the use of either or both physical and wireless communications links. Row return engine 106 may be downloaded to persistent storage 508 through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., row return engine 106, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for processing a query in a column database, the computer program product comprising:
    one or more computer-readable storage media and program instructions stored on the one or more computer-readable storage media, the program instructions comprising:
    program instructions to associate a first set of metadata values with a set of records in table, wherein each record has an associated state indicated by a metadata value;
    program instructions to receive a query to return a plurality of records of the set of records;
    program instructions to determine that the plurality of records in the set of records satisfies the query, wherein determining includes determining a first row having a tuple state number that matches the query, scanning information in a column associated with the first row sequentially from a lowest tuple sequence number, wherein a tuple sequence number indicates an ordinal location of each of the plurality of records within the column;
    program instructions to perform an anti-join operation on a processed list and an unprocessed list, wherein performing the anti-join operation includes removing one or more tuple state numbers that appear in both the processed list and the unprocessed list;
    responsive to a determination that at least one of the one or more tuple state numbers remain in the unprocessed list, program instructions to cache a second high water mark for each of one or more insert ranges in the unprocessed list and scan the plurality of records between a first high water mark and the second high water mark;
    program instructions to determine whether at least a first record in the plurality of records between the first high water mark and the second high water mark that satisfies the query is in a returnable state based, at least in part, on the metadata value;
    responsive to a determination that at least the first record of the plurality of records is in a returnable state, program instructions to determine whether at least the first record is being updated based, at least in part, on the metadata values; and
    responsive to a determination that a write lock is held on at least the first record, program instructions to determine whether the first row has a tuple sequence number identified in a previous row to determine if a value has been entered to indicate that the first row is an updated version row of the previous row.

2. The computer program product of claim 1, wherein the program instructions further comprise:
    program instructions to return at least the first record in response to the query, responsive to determining that at least the first record in the plurality of records is in a returnable state.

3. The computer program product of claim 1, wherein the program instructions further comprise:
    program instructions to determine the first high water mark, wherein the first high water mark indicates the ordinal location of a most recently committed inserted record in the set of records;
    program instructions to determine that the ordinal location of the first record of the plurality of records matches the first high water mark; and
    program instructions to return at least the first record of the plurality of records that is in a returnable state.

4. The computer program product of claim 1, wherein the program instructions further comprise:
    program instructions to determine that at least a second record in the plurality of records is not in a returnable state, responsive to determining that at least the first record in the plurality of records is in a returnable state; and
    program instructions to return at least the first record in response to the query.

5. The computer program product of claim 1, wherein the program instructions further comprise:
    program instructions to return at least the first record, responsive to determining that a write lock is held on the first record.

6. The computer program product of claim 1, wherein the program instructions further comprise:
    program instructions to identify a second record in the plurality of records that is in a returnable state, and is an updated version of the first record, responsive to determining that a write lock is not held on at least the first record, wherein identification of the second record in the plurality of records is an updated version of the first record is based, at least in part, on a second set of metadata values associated with the set of records in the table.

7. A computer system for processing a query in a column database, the computer system comprising:
    one or more computer processors;
    one or more computer-readable storage media;
    program instructions stored on the computer-readable storage media for execution by at least one of the one or more processors, the program instructions comprising:
    program instructions to associate a first set of metadata values with a set of records in table, wherein each record has an associated state indicated by a metadata value;
    program instructions to receive a query to return a plurality of records of the set of records;
    program instructions to determine that the plurality of records in the set of records satisfies the query, wherein determining includes determining a first row having a tuple state number that matches the query, scanning information in a column associated with the first row sequentially from a lowest tuple sequence number, wherein a tuple sequence number indicates an ordinal location of each of the plurality of records within the column;

program instructions to perform an anti-join operation on a processed list and an unprocessed list, wherein performing the anti-join operation includes removing one or more tuple state numbers that appear in both the processed list and the unprocessed list;

responsive to a determination that at least one of the one or more tuple state numbers remain in the unprocessed list, program instructions to cache a second high water mark for each of one or more insert ranges in the unprocessed list and scan the plurality of records between a first high water mark and the second high water mark;

program instructions to determine whether at least a first record in the plurality of records between the first high water mark and the second high water mark that satisfies the query is in a returnable state based, at least in part, on the metadata value;

responsive to a determination that at least the first record of the plurality of records is in a returnable state, program instructions to determine whether at least the first record is being updated based, at least in part, on the metadata values;

responsive to a determination that at least the first record is being updated, program instructions to perform a lock test to determine whether a whether a write lock is held on at least the first record; and responsive to a determination that a write lock is held on at least the first record, program instructions to determine whether the first row has a tuple sequence number identified in a previous row to determine if a value has been entered to indicate that the first row is an updated version row of the previous row.

8. The computer system of claim 7, wherein the program instructions further comprise:

program instructions to return at least the first record in response to the query, responsive to determining that at least the first record in the plurality of records is in a returnable state.

9. The computer system of claim 7, wherein the program instructions further comprise:

program instructions to determine the first high water mark, wherein the first high water mark indicates the ordinal location of a most recently committed inserted record in the set of records;

program instructions to determine that the ordinal location of the first record of the plurality of records matches the first high water mark; and program instructions to return at least the first record of the plurality of records that is in a returnable state.

10. The computer system of claim 7, wherein the program instructions further comprise:

program instructions to determine that at least a second record in the plurality of records is not in a returnable state, responsive to determining that at least the first record in the plurality of records is in a returnable state; and program instructions to return at least the first record in response to the query.

11. The computer system of claim 7, wherein the program instructions further comprise:

program instructions to determine whether at least the first record is being updated based, at least in part on the metadata values;

program instructions to determine whether a write lock is held on at least the first record, responsive to determining that at least the first record is being updated; and program instructions to identify a second record in the plurality of records that is in a returnable state, and is an updated version of the first record, responsive to determining that a write lock is not held on at least the first record, wherein identification of the second record in the plurality of records is an updated version of the first record is based, at least in part, on a second set of metadata values associated with the set of records in the table.

* * * * *